United States Patent
Burguieres

(10) Patent No.: US 12,043,790 B2
(45) Date of Patent: Jul. 23, 2024

(54) FORMING A SOLID EPOXY PLUG WITHIN A PIPE

(71) Applicant: Philip Martial Burguieres, Houston, TX (US)

(72) Inventor: Philip Martial Burguieres, Houston, TX (US)

( * ) Notice: Subject to any disclaimer, the term of this patent is extended or adjusted under 35 U.S.C. 154(b) by 62 days.

(21) Appl. No.: 17/964,382

(22) Filed: Oct. 12, 2022

(65) Prior Publication Data

US 2024/0124759 A1    Apr. 18, 2024

(51) Int. Cl.
C09K 8/42    (2006.01)

(52) U.S. Cl.
CPC ..................... *C09K 8/426* (2013.01)

(58) Field of Classification Search
None
See application file for complete search history.

(56) References Cited

U.S. PATENT DOCUMENTS

| | | | |
|---|---|---|---|
| 7,762,329 B1* | 7/2010 | Morgan | C09K 8/506 166/295 |
| 2010/0012319 A1* | 1/2010 | Mortensen | F16L 55/1003 166/192 |
| 2018/0148991 A1* | 5/2018 | Hearn | H10B 41/27 |
| 2018/0216437 A1* | 8/2018 | Shafer | E21B 33/134 |
| 2019/0292876 A1* | 9/2019 | Cabot | E21B 33/134 |

\* cited by examiner

*Primary Examiner* — Anuradha Ahuja

(57) ABSTRACT

A method includes deploying a solid epoxy material into a target region of a pipe and delivering a liquid epoxy formulation into the target region of the pipe so that the liquid epoxy formulation fills voids around the solid epoxy material and inside the pipe within the target region, wherein the liquid epoxy formulation cures within the voids to form a solid epoxy plug with the solid epoxy material within the target region of the pipe.

18 Claims, 5 Drawing Sheets

FORMING A SOLID EPOXY PLUG WITHIN A PIPE

BACKGROUND

The present disclosure relates to methods for plugging a pipe.

BACKGROUND OF THE RELATED ART

Oil wells and gas wells are bored down into the Earth to reach a geological formation that is expected to contain oil or gas. A great amount of planning, effort and expense goes into the drilling of each well, yet the amount of oil or gas production and the productive life of each well may vary.

During the life of each well, one or more operations may be performed to control, manage, or operate the well in a desired manner. For example, a stimulation technique such as hydraulic fracturing may be employed in some wells to increase the amount of oil or gas produced from the well. In some wells, an enhanced oil recovery process may be used to extract a greater proportion of the oil within a particular formation.

Some operations in a well may require plugging a pipe, such as a drill string, tubing string, or casing. For example, a plugback operation may involve setting a non-permeable plug above an old producing zone so that the well can be perforated to create fluid communication with an upper with no co-mingling of the fluids of the upper zone with the fluids of the old producing zone. In another example, a plug and abandon operation may involve permanent plugging of a well. Still further, a water shut off operation may involve plugging a portion of a producing zone to reduce produced water.

BRIEF SUMMARY

Some embodiments provide a method comprising deploying a solid epoxy material into a target region of a pipe and delivering a liquid epoxy formulation into the target region of the pipe so that the liquid epoxy formulation fills voids around the solid epoxy material and inside the pipe within the target region, wherein the liquid epoxy formulation cures within the voids to form a solid epoxy plug with the solid epoxy material within the target region of the pipe.

DETAILED DESCRIPTION

Figure 1:
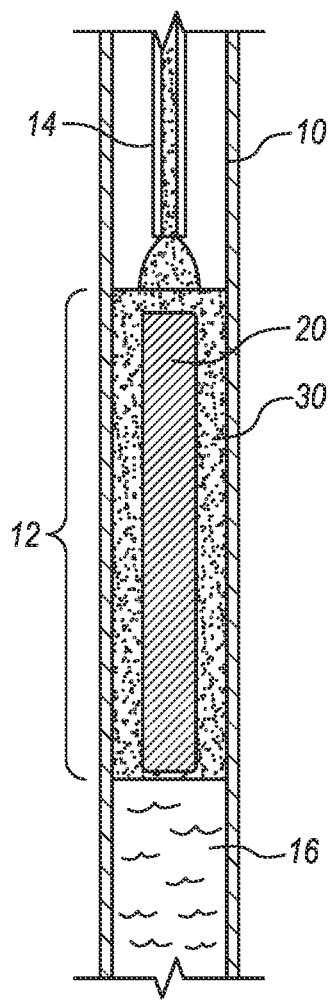
FIG. 1 is a diagram of a pipe having a target region where a solid epoxy member has been deployed and a liquid epoxy formation is being delivered.

Some embodiments provide a method comprising deploying a solid epoxy material into a target region of a pipe and delivering a liquid epoxy formulation into the target region of the pipe so that the liquid epoxy formulation fills voids around the solid epoxy material and inside the pipe within the target region, wherein the liquid epoxy formulation cures within the voids to form a solid epoxy plug with the solid epoxy material within the target region of the pipe.

The solid epoxy material is an epoxy material that has already been cured and allowed to solidify. Accordingly, the heat produced by the curing of the epoxy material (i.e., the exotherm) has already been removed or dissipated such that the solid epoxy material has an ambient temperature. The operation of deploying the solid epoxy material into the target region of the pipe does not cause any further exotherm within the mass of the solid epoxy material. By contrast, the liquid epoxy formulation that fills the voids around the solid epoxy material and inside the pipe within the target region may produce heat as a result of an exothermic reaction with itself and with an exposed surface of the solid epoxy material as the liquid epoxy formulation cures and becomes solid. The amount of heat produced within the pipe is a function of the amount (i.e., "thermal mass") of liquid epoxy formulation delivered into the target region of the pipe. Similarly, the maximum temperature reached at any location within the target region of the pipe during curing of the liquid epoxy formulation is a function of the ambient temperature within the target region of the pipe and the amount of liquid epoxy formulation that must be used to fill the voids in the solid epoxy material at any given location with the target region of the pipe. The heat produced by the exothermic curing reaction may be dissipated through the walls of the pipe and into any surrounding formation or fluids. However, heat dissipation through the walls of the pipe is slow and the temperature of the curing liquid epoxy formulation can rise substantially above ambient temperature within the target region of the pipe before the temperature slowly declines back to the ambient temperature. Furthermore, epoxy materials may have an "R-value", a measure of thermal resistance per unit area, from about 7 to about 9, which means that epoxy material have high thermal insulating properties. Accordingly, the heat produced during the curing of the epoxy formulation may not dissipate very quickly.

In some embodiments, the solid epoxy plug is formed within the pipe to produce a fluid tight seal within the pipe, such as a gas tight seal and/or a liquid tight seal. However, the curing liquid epoxy formulation and the resulting polymer chains of the cured epoxy are in an expanded condition at temperatures significantly greater than ambient temperature and may contract as the temperature of the cured epoxy declines back to the ambient temperature. This contraction in the volume of the cured epoxy ("shrinkage") may cause the cured epoxy to pull away from the interior walls of the pipe and jeopardize the integrity of the fluid tight seal within the pipe. Accordingly, a technical benefit of the embodiments herein is that the expansion of the cured epoxy may be controlled by limiting the amount of liquid epoxy formulation delivered to the target region of the pipe, and thereby limiting the resulting extent of the exotherm and the maximum temperature of the cured epoxy, by deploying solid epoxy material into the target region. Because the volume of the solid epoxy plug to be formed within target region of the pipe may be established by the desired length of the solid epoxy plug and the diameter of the pipe, the volume or thermal mass of liquid epoxy formulation that must be delivered to the target region to be cured within the pipe may be reduced by an amount equivalent to the volume of the solid epoxy material deployed into the target region of the pipe. In one example, the solid epoxy material may form between 50% and 90% of the solid epoxy plug, between 60% and 85% of the solid epoxy plug, or between 75% and 80% of the solid epoxy plug.

Once the uncured liquid epoxy formulation is within the voids, the liquid epoxy formulation may react with a surface of the solid epoxy material. Accordingly, the solid epoxy plug may be formed within the pipe as a solid monolithic plug. As used herein, a monolithic plug is a plug that has no joints or seams and constitutes a single piece. A most preferred monolithic plug may have the same composition through the plug. Optionally, the liquid epoxy formulation may be delivered into the target region under a pressure that is greater than a pressure within the target region of the pipe so that the liquid epoxy formulation is forced or "squeezed" into the voids.

Some embodiments include forming the liquid epoxy formulation by combining an epoxy resin portion and a hardener portion within the pipe adjacent the target region. The resin and hardener portions may be combined within the pipe by sequential delivery of the resin and hardener portions into the target region through a single tube or channel, or by simultaneous delivery of the resin and hardener portions into the target region through separate tubes, channels or compartments.

In some embodiments, the solid epoxy material may be formed from an epoxy formulation that is the same as the liquid epoxy formulation delivered into the target region of the pipe. The solid epoxy material is cured and allowed to reach an ambient temperature prior to being deployed into the target region of the pipe. However, forming the solid epoxy material from the same epoxy formulation as the liquid epoxy formulation may improve reaction and bonding between the solid epoxy material and the liquid epoxy formulation. For example, the solid epoxy material may have the same or similar epoxy resin, the same or similar hardener, and/or the same or similar ratio of epoxy resin to hardener as the liquid epoxy formulation. Alternatively, the solid epoxy material and the liquid epoxy formulation may both be formed from epoxy resins having different epoxide equivalent weights, but the same hardener functional groups such as amines, acids, phenol, alcohols and thiols. Furthermore, the solid epoxy material and the liquid epoxy formulation may both be formed with an epoxy resin and a hardener, may both be formed with an epoxy resin that cross-links with itself via catalytic homopolymerization, or may include a first composition having an epoxy resin and a hardener and a second composition having an epoxy resin that cross-links with itself.

In some embodiments, the solid epoxy material and the liquid epoxy formulation may be selected to provide the same or similar density. Having the same or similar density will reduce or prevent undesirable separation or settling of one from the other and/or facilitate deployment/delivery into the target region of the pipe. In one option, the density of the solid epoxy material and the density of the liquid epoxy formulation are both less than the density of a wellbore fluid present within the pipe. Accordingly, both the solid epoxy material and the liquid epoxy formulation may float above the wellbore fluid. Therefore, the position of the solid epoxy plug within the pipe may be established by controlling the level of the wellbore fluid within the pipe.

Some embodiments of the solid epoxy material may include particulates. When particulates are deployed into the target region of the pipe, voids may exist around each individual particulate forming channels into the volume of the particulates through which the liquid epoxy formulation may flow and cure therein. In one option, the solid epoxy particulates may be discharged from a bailer or dropped into an upper end of the pipe. Non-limiting examples of the particulates may include rods, spheres (balls), or irregular shapes.

Some embodiments of the solid epoxy material may include a solid epoxy member having a length dimension that is greater than an internal diameter of the pipe. For example, the solid epoxy member may have an aspect ratio greater than three. In one option, the solid epoxy member is a cylinder, which extend axially within the pipe. Furthermore, the solid epoxy member may have a central axis and a uniform cross-sectional profile along the central axis. Some solid epoxy members may form a majority of the solid epoxy plug and may be fluid impermeable, such that the liquid epoxy formulation cures around the solid epoxy member to bond the solid epoxy member to the walls of the pipe and prevent fluid flow between the pipe and the solid epoxy member.

In some embodiments, the solid epoxy member may be coupled to a centralizer for centering the solid epoxy member within the pipe and for providing an annular region around the solid epoxy member where the liquid epoxy formulation is delivered to encapsulate the solid epoxy member. The centralizer may be a discrete component secured to the solid epoxy member, such as a centralizer having its own upper collar, lower collar and centralizing elements, such as bow-springs or rigid/semi-rigid blades, extending between the upper and lower collars. However, the centralizer may also be formed with individual components or blades that are attached to an external surface of the solid epoxy member or partially molded into the solid epoxy member as the solid epoxy member is cured. A solid epoxy member may be deployed into the target region of the pipe by dropping the solid epoxy member into an upper end of the pipe or by lowering the solid epoxy member on a pipe, slickline or wireline. For example, the cured solid epoxy member may be machined or threaded to form an interface or connection that facilitates various conveyance methods such as quick disconnects, fishnecks and threaded connections.

In some embodiments, the size of the solid epoxy member, such as a cylinder, may be adjusted to reduce the exotherm and the maximum temperature of the curing epoxy for a given ambient temperature. Essentially, for any pipe internal diameter and ambient temperature, a particular diameter cylinder may be recommended to occupy a specific volume of the pipe so that the amount of catalyzing epoxy at any location along the axial length of the plug will not exotherm to a temperature that jeopardizes the integrity of the resulting plug. The length of the cylinder may also correspond to the volume of catalyzing epoxy that can be conveyed to the location of the plug within the pipe. For example, a particular bailer may have a fluid capacity of 8 gallons and the cured epoxy cylinder may be long enough so that the total volume of catalyzing epoxy delivered by the bailer will completely encapsulate the cylinder, but without much excess catalyzing epoxy. Accordingly, using a cured epoxy cylinder may significantly increase the length of the plug that can be formed in a pipe with a single bailer run.

In some embodiments, the pipe is positioned in a wellbore and the pipe is selected from a pipe string, tubing string or wellbore casing. For example, the pipe may have a diameter ranging from 5 inches to more than 20 inches. Furthermore, the solid epoxy plug may be formed as part of a plugback operation, a plug and abandon operation, and/or a water shut off operation. Without limitation, a plugback operation may include setting a non-permeable plug above an old producing zone to facilitate perforating and producing from a zone above the old producing zone with no co-mingling of fluids between the zones; a plug and abandon operation may include setting a full permanent, testable plug for permanent plugging of a well; and a water shut off operation may include plugging a portion of a producing zone to reduce produced water.

FIG. 1 is a diagram of a pipe 10 having a target region 12 where a solid epoxy member 20 has been deployed and a liquid epoxy formation 30 is being delivered. In this illustration, the liquid epoxy formulation 30 is being delivered to the target region 12 through a tubing string 14 and is then released to flow over and around the solid epoxy member 20. For example, the solid epoxy member 20 and a liquid epoxy formation 30 have been deployed and the liquid epoxy formation 30 may be less dense than a wellbore fluid 16 and "float" in the target region 12 above the wellbore fluid 16 until cured to the inner wall of the pipe 10. The diagram is a non-limiting conceptual illustration of the target region 12 of the pipe 10 and the relative amounts of the solid epoxy member 20 and the liquid epoxy formation 30 should not be interpreted as being representative of any particular embodiment.

The uncured epoxy formulation 30 readily and competently reacts with the external surface of the solid epoxy member 20 to form a solid epoxy plug (20, 30) and also bond to the inner wall of the pipe 10. In testing, several test pieces (representing solid epoxy plugs) have been formed by pouring a catalyzing epoxy formulation over cylinders of cured epoxy at ambient temperature. Once the catalyzing epoxy formulation had cured around each solid epoxy cylinder, each test piece was placed in a hydraulic press and subjected to over 20,000 pounds of force independently applied to both the cylinder and the epoxy portion formed about the cylinder. The test pieces failed randomly rather than separating at the interface between the previously cured solid epoxy cylinder and the cured epoxy formulation that had been poured over the cylinder. These results showed that the test piece formed a monolithic solid epoxy plug despite being formed from a cured cylinder and curing an epoxy formulation around the cured cylinder. Accordingly, a solid epoxy cylinder and a liquid epoxy formulation may be used to form a monolithic epoxy plug with a pipe.

The solid epoxy cylinder is provided into the target region 12 at ambient temperature and does not exotherm since the solid epoxy is already cured. Furthermore, the solid epoxy cylinder 20 occupies volume inside the target region 12 of the pipe 10 which effectively reduces the total volume of the catalyzing epoxy formulation 30 that is necessary to form the plug. Specifically, the volume of catalyzing epoxy needed to form the plug is a function of the void space around and between the solid epoxy cylinder 20 and within the internal surface of the pipe 10 over the desired length of the plug (the target region 12). This significantly reduces the thermal mass of the catalyzing epoxy 30 for any given plug dimensions, which reduces the temperature of the catalyzing epoxy during the exotherm and reduces the thermal expansion of the catalyzing epoxy, and results in an epoxy plug (the combination of the cylinder 20 and the formulation 30) that maintains its bond with the internal surface of the pipe being plugged.

Figure 2:
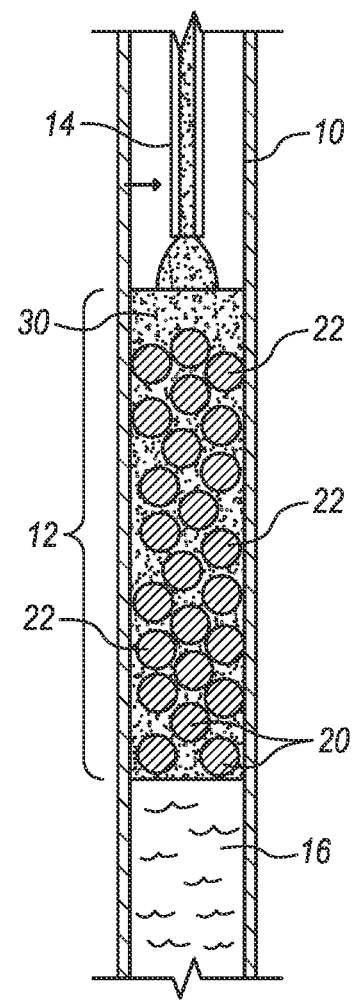
FIG. 2 is a diagram of a pipe having a target region where solid epoxy material has been deployed and a liquid epoxy formation is being delivered.

FIG. 2 is a diagram of a pipe 10 having a target region 12 where solid epoxy material 22 has been deployed and a liquid epoxy formulation 30 is being delivered. The diagram of FIG. 2 is similar to the diagram of FIG. 1 except that the solid epoxy cylinder 20 of FIG. 1 is replaced with a solid epoxy particulate material 22. Accordingly, the liquid epoxy formulation 30 flows between the individual particulate pieces as well as flowing between the solid epoxy material 22 and the inner walls of the pipe 10. However, similar to the configuration in FIG. 1, the use of the solid epoxy material reduces the thermal mass of the catalyzing epoxy 30 that is necessary for any given plug dimensions, which reduces the temperature of the catalyzing epoxy during the exotherm and reduces the thermal expansion of the catalyzing epoxy, and results in an epoxy plug (the combination of the solid particulates 22 and the formulation 30) that maintains its bond with the internal surface of the pipe being plugged.

Figure 3A:
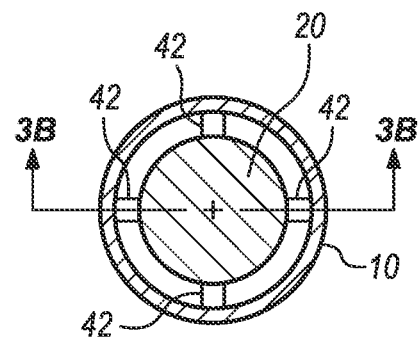
FIGS. 3A-B are cross-sectional top and side views of a solid epoxy member deployed within the pipe and having a centralizer to center the solid epoxy member within the pipe.
Figure 3B:
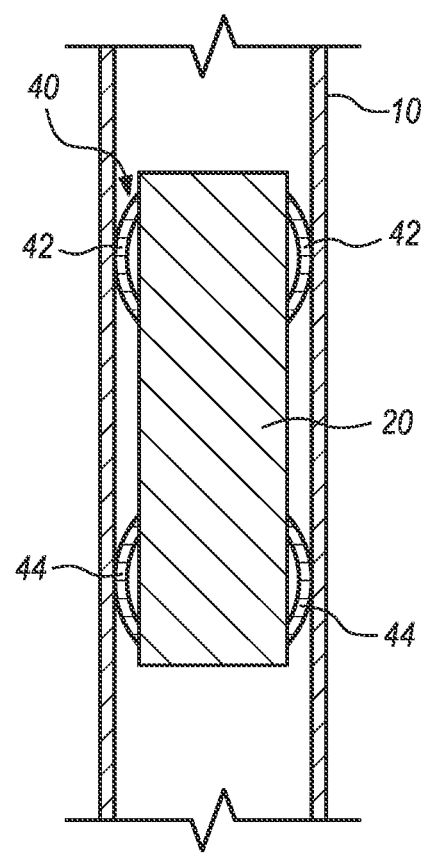

FIGS. 3A-B are cross-sectional top and side views of a solid epoxy member 20 deployed within the pipe 10 and having a centralizer 40 to center the solid epoxy member 20 within the pipe 10. In reference to FIG. 3A, the centralizer 40 provides four separate blades 42 secured to the solid epoxy member 20 with generally equal spacing around the circumference of the solid epoxy member 20. As a result, the solid epoxy member 20 may have a central axis that is roughly aligned with a central axis of the pipe 10. In reference to FIG. 3B, the centralizer 40 provides the four blades 42 around the circumference of an upper (first) end of the solid epoxy member 20 and provide a second set of four blades 44 around the circumference of a lower (second) end of the solid epoxy member 20. A centralizer 40 with two sets of blades may be even more effective to centering the solid epoxy member 20 within the pipe 10. Furthermore, the centralizer 40 leaves a substantially similar annular void about the outer surface of the solid epoxy member 20 where the liquid epoxy formulation may be delivered (see also FIG. 1).

Some embodiments provide a method that includes introducing a first liquid component of an epoxy formulation or composition into a pipe, introducing a second liquid component of the epoxy formulation into the pipe, and then allowing the first and second liquid components to mix within the well. The first liquid component may be kept separate from the second liquid component until after the first and second liquid components have been delivered into the pipe and/or into the target region within the pipe. Furthermore, the first liquid composition includes a first reactive component, the second liquid composition includes a second reactive component, and the first reactive component reacts with the second reactive component in response to mixing the first and second liquid compositions within the well. The method further includes causing the mixed compositions to engage the wellbore.

In some embodiments, the first reactive component is an epoxy resin, also known as a polyepoxide. Epoxy resins include a reactive epoxide functional group that allows the epoxy resins to react and cross-link with themselves through catalytic polymerization or with a wide range of co-reactants, such as polyfunctional amines, acids, acid anhydrides, phenols, alcohols and thiols. The co-reactants may be referred to as "hardeners" and the cross-linking reaction may be referred to as "curing." The reaction of epoxy resin with themselves or polyfunctional hardeners forms a thermosetting polymer. Such thermosetting polymers may have desirable physical properties, thermal stability and chemical resistance. In one option, the epoxy resin may include monomers, dimers, oligomers, or short chain polymers, so long as the epoxy resin can be transported in the first liquid composition. The second reactive component included in the second liquid composition may be any of the co-reactants or hardeners or may be a catalyst to support catalytic polymerization. Accordingly, keeping the first liquid composition including an epoxy resin separate from the second liquid composition containing a hardener or catalyst will prevent the curing reaction from occurring. Rather, the curing reaction between the epoxy resin and the hardener or catalyst cannot begin until the first and second liquid compositions become mixed.

In some embodiments, the first and second liquid compositions are introduced into a target region of the pipe, wherein the first and second liquid compositions are mixed at the target region of the pipe. Introducing or delivering the first and second liquid compositions to the target region of the pipe means that the first and second reactive components will not come into contact with each other until the first and second liquid compositions are mixed at the target region of the pipe. Introducing or delivering the first and second liquid compositions to or near to the target region prior to mixing these compositions has several benefits over pumping a reacting mixture to the target region. One of the technical benefits is that there is no reaction occurring during the time required to pump the first and second liquid compositions to target region and, therefore, there is no appreciable change in viscosity of the compositions during the pumping. Further technical benefits may include avoiding the use of chemical retarders in the compositions intended to extend the cure time and avoiding wellsite personnel and equipment exposure to the reaction conditions and cleanup. Still further technical benefits may include reduced possibility of contaminating the first and second liquid compositions with solids and/or fluids in the pipe and greater control over the final physical properties of the reaction product. These and other benefits of various embodiments may also reduce the cost of operations that are directed at causing the mixed compositions to engage the solid epoxy material and the inner wall of the pipe.

In some embodiments, the step of introducing the first liquid composition into the pipe may include pumping the first liquid composition into the pipe through tubing that has been lowered into the pipe. Similarly, the step of introducing the second liquid composition into the pipe may include pumping the second liquid composition into the pipe through the tubing. Optionally, the tubing may be selected from coiled tubing and jointed pipe. However, the liquid compositions may be pumped into a first end of the tubing at the surface adjacent the wellhead and through the tubing to a distal end of the tubing positioned in or near the target region of the pipe.

In some embodiments, the tubing is a bifurcated tubing having first and second channels, and wherein the first liquid composition is pumped through the first channel and the second liquid composition is pumped through the second channel. Accordingly, the bifurcated tubing keeps the first and second compositions separated over the length of the tubing. One optional form of a bifurcated tubing is concentric tubing in which the first and second channels are concentric channels. Specifically, one channel may be an inner tube and the other channel may be an annular region between an outer tube and the inner tube. Optionally, the inner tube may be eccentrically disposed inside the outer tube, such that the inner and outer tubes do not share or do not necessarily share a central axis. Furthermore, the bifurcated tubing may include a single tubular structure with a barrier separating the cross-sectional area of the tubing into two channels. Furthermore, the first and second channels may have the same amount of cross-sectional area (i.e., open area perpendicular to the axis of the tubing) or some different amount of cross-sectional area. In one option, if a first channel is intended to carry a first volume of a first composition to a target region and a second channel is intended to carry a second volume of a second composition to the target region, and if the first volume is twice the second volume, then the cross-sectional area of the first channel maybe greater than the cross-sectional area of the second channel, such as about twice the area of the second channel. In another option, if a first composition has a greater viscosity than and a second composition, then the channel intended to carry the first composition may have a greater cross-sectional area than the second channel intended to carry the second composition.

In some embodiments, the step of mixing the first and second liquid compositions within the pipe may include simultaneously pumping the first and second liquid compositions through a static mixer coupled in fluid communication with distal ends of the first and second channels of the bifurcated tubing within the pipe. A first end of the static mixer is open to the first and second channels and a second end of the static mixer is open to the pipe being plugged. As the first and second liquid compositions are pumped through the static mixer, fixed plates or baffles cause the two separate fluid streams to become mixed. For example, the fixed plates or baffles may cause mixing to occur through flow division or radial mixing.

In some embodiments, the first liquid composition may be pumped through the first channel of the tubing at a first volumetric flow rate, the second liquid composition may be pumped through the second channel of the tubing at a second volumetric flow rate, and a ratio of the first and second volumetric flow rates may provide a predetermined ratio of the first and second liquid compositions through the static mixer before the mixed compositions engage the pipe or the solid epoxy material within the pipe. Accordingly, the first and second volumetric flow rates may provide a predetermined volumetric ratio of the first and second liquid compositions through the static mixer so that the mixed liquid composition output from the static mixer is a mixture having the predetermined volumetric ratio. Mixing the first and second liquid compositions in a predetermined volumetric ratio is desirable so that the first and second reactive components are provided in a desired proportion to support a reaction that will yield the intended reaction product. For example, the physical properties of a solid epoxy plug intended to seal off a pipe are affected by the ratio of the reactive components used to form the solid plug. A predetermined ratio of the first and second reactive components may be produced in the pipe by knowing the concentration of the first reactive component in the first liquid composition, the concentration of the second reactive component in the second liquid composition and controlling the relative volumetric flow rates of the first and second liquid compositions to achieve the predetermined ratio. The actual volumetric flow rates of the first and second liquid compositions may be selected in conjunction with a selected static mixer diameter and a range of fluid velocity through the static mixer that will provide sufficient mixing.

In some embodiments, the first liquid composition may be pumped by a first pump coupled to the first channel of the tubing and the second liquid composition may be pumped by a second pump coupled to the second channel of the tubing. Specifically, an inlet to the first pump may be in fluid communication with a first storage container or tank holding the first liquid composition and an outlet from the first pump may be in fluid communication with the first channel of the tubing. Similarly, an inlet to the second pump may be in fluid communication with a second storage container or tank holding the second liquid composition and an outlet from the second pump may be in fluid communication with the second channel of the tubing. Accordingly, the first pump controls a volumetric flow rate of the first liquid composition from the first storage container or tank into the first channel and, ultimately, into the target region of the pipe, and the second pump controls a volumetric flow rate of the second liquid composition from the second storage container or tank into the second channel and, ultimately, into the target region of the pipe. In one option, the first and second pumps may be coupled to a single motor via a mechanical mechanism selected from a machined shaft, chain, belt and hydrostatic transmission such that the ratio of the volumetric flow rates from the first and second pumps may be fixed.

In some embodiments, the method may further include continuing to pump the first and second liquid compositions through the static mixer until delivering a predetermined quantity of the mixed compositions into the pipe or until achieve a predetermined condition in the pipe. Optionally, after delivering the predetermined quantity or achieving the predetermined condition, any remaining amount of the first liquid composition may be flushed back into a storage container and any remaining amount of the second liquid composition may be flushed back into a second storage container. It is possible to recover the first and second liquid compositions from the tubing since the first and second channels keep the first and second liquid compositions separated to avoid reactions and/or contamination therebetween.

In some embodiments, the steps of introducing the first liquid composition into the pipe and introducing the second liquid composition into the pipe may include lowering a tool into the pipe, wherein the tool includes a first chamber containing the first liquid composition and a second chamber containing the second liquid composition. For example, the tool may be a vessel, such as a bailer, that is lowered into the pipe on another jointed pipe, coiled tubing, electric wireline or slickline. After lowering the tool into the pipe, the step of mixing the first and second liquid compositions within the pipe may include simultaneously forcing the first and second liquid compositions out of the first and second chambers through a static mixer coupled in fluid communication with the first and second chambers and into the pipe. In one option, the first and second liquid compositions may be forced out the first and second chamber, respectively, by applying pressure to the top of the first and second chambers.

Compared to methods that mix reactive components at the surface and then pump the mixed and actively reacting components into a pipe, embodiments may prevent the reactive components from mixing and reacting (i.e., catalyzing) until after the reactive components have been introduced into the pipe. Specifically, some embodiments may prevent the reactive components from mixing and reacting until the compositions containing those reactive components are delivered to a target region of the pipe. Some embodiments that include downhole mixing and reacting of the reactive components may provide greater operational flexibility, less potential for contamination of the reactive components, less potential for worker exposure to reaction conditions, reduced or eliminated need for hazardous cleaning chemicals, less waste of reactive components, and potentially lower cost. One or more of these benefits may be achieved in either a simultaneous introduction through bifurcated tubing or introduction using a dual-chambered tool such as a bailer.

Figure 4:
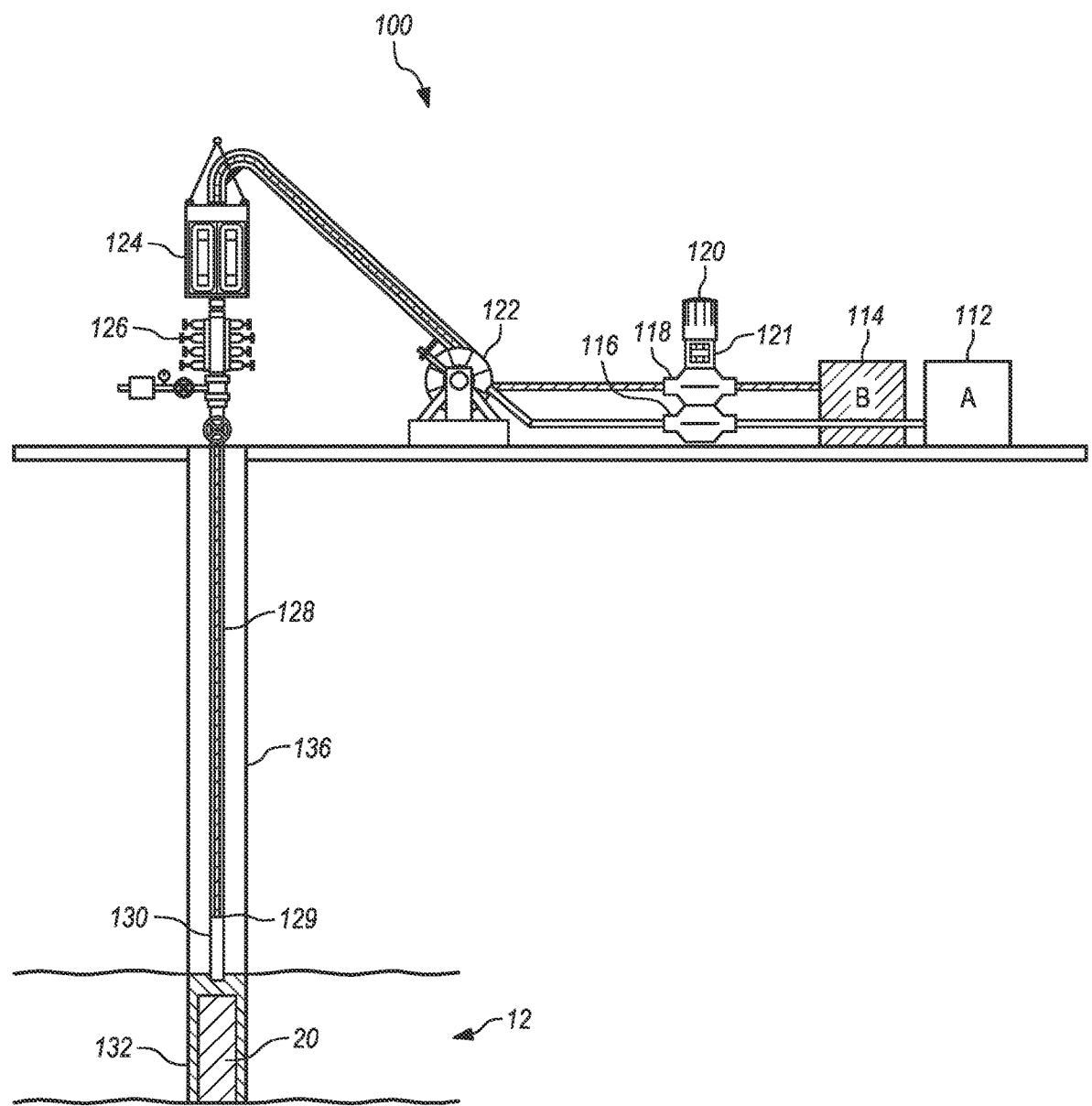
FIG. 4 is a diagram of an apparatus including bifurcated tubing for introducing two separate liquid compositions into the well and mixing the compositions within the well to initiate a reaction.

FIG. 4 is a diagram of an apparatus or system 100 including bifurcated tubing 128 for introducing two separate liquid compositions ("A" and "B") into a pipe 136, such as wellbore casing, and mixing the compositions within the pipe in order to initiate a reaction. In some embodiments, the objective of the operation may be to form a solid plug 132 within a target region 12 of the pipe 136.

A first storage tank 112 may store a first liquid composition (A) containing a first reactive component and a second storage tank 114 may store a second liquid composition (B) containing a second reactive component. Optionally, the first and second liquid compositions may include any number of components, whether reactive or non-reactive, but the components within the first liquid composition should not undergo a reaction independent of the second liquid composition, and the components within the second liquid composition should not undergo a reaction independent of the first liquid composition. As a result, both first and second liquid compositions are stable until mixed together.

A first pump 116 has an inlet port in fluid communication with the first storage tank 112 via an inlet pipe and an outlet port in fluid communication with a first channel of bifurcated tubing 128 via an outlet pipe. The first pump is operated to draw the first liquid composition A from the first storage tank 112 and deliver the first liquid composition A into the first channel of the bifurcated tubing 128. A second pump 118 has an inlet port in fluid communication with the second storage tank 114 via an inlet pipe and an outlet port in fluid communication with a second channel of bifurcated tubing 28 via an outlet pipe. The second pump is operated to draw the second liquid composition B from the second storage tank 114 and deliver the second liquid composition B into the second channel of the bifurcated tubing 128. A tubing reel 122 may be provided and may include fluidic connections between the outlet pipes from the first and second pumps 116, 118 to the first and second channels of the tubing.

The first pump 112 and the second pump 114 may be operated by a single motor 120, or each pump 112, 114 may be operated by a separate motor. However, the first and second pumps 112, 114 may be controlled to achieve a predetermined ratio of volumetric flow rates, such as twice the volumetric flow rate of the first liquid composition A as the volumetric flow rate of the second liquid composition B. A mechanical timing mechanism 121, such as a machined shaft, chain, belt or hydrostatic transmission, may be employed between the motor 120 and the pumps 112, 114 to establish the predetermined ratio that may be required for proper catalyzation or other reaction.

In the illustrated embodiment, a coiled tubing injector 124 is suspended above the wellhead 126 to allow the coiled tubing 128 to be raised and lowered in the pipe 136, such as a wellbore casing. The tubing 128 may be inserted into the pipe 136 until the distal end 129 supporting the static mixer 130 reaches the target region 12. With the distal end of the tubing in a desired position, the pumps 116, 118 are operated to deliver the first and second liquid compositions, in the predetermined ratio, into the first and second channels of the bifurcated tubing 128, through the static mixer 130, and into the pipe 136 below or around the static mixer 130. The first and second reactive components of the first and second liquid compositions, respectively, begin to react upon mixing in the static mixer 130 and will continue to react in the pipe to form the solid plug 132. Specifically, the first and second reactive components of the first and second liquid compositions form the liquid epoxy formulation that flows around the solid epoxy member 20 and cures between the solid epoxy member 20 and the inner wall of the pipe 136 to form a solid epoxy plug 132.

After a sufficient total volume of the mixture has been delivered into the pipe to form the solid plug, the tubing 128 may be withdrawn from the pipe 136. Optionally, any of the first and/or second liquid compositions that was not used or contaminated may be flushed back into the appropriate storage tank to be used later. Only the end of the mixing device should have any of the reaction products, such as catalyzed or hardened polymer, that may require cleanup, greatly reducing handling and cleanup costs.

Figure 5A:
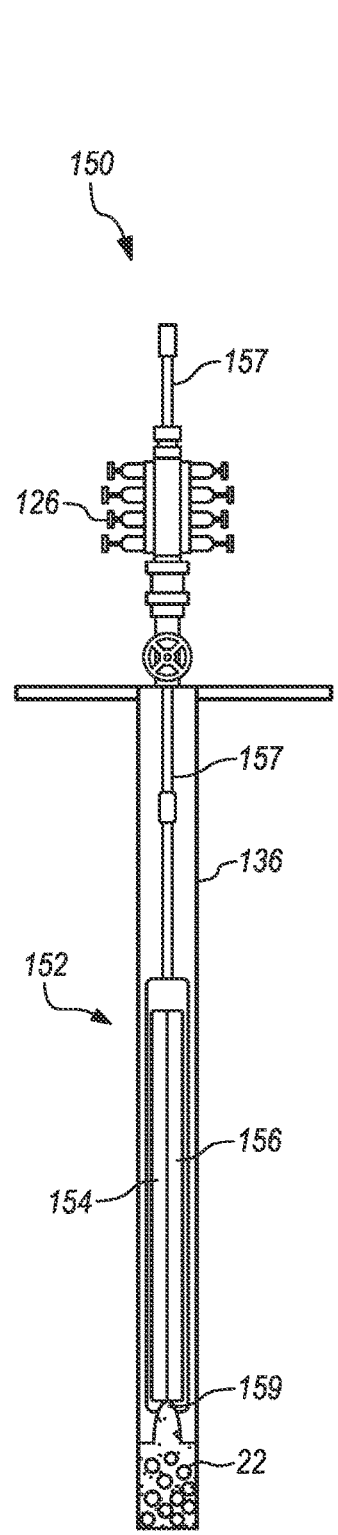
FIGS. 5A-B are diagrams of an apparatus including a dual-chamber tool containing two separate liquid compositions that is lowered into the well prior to mixing the compositions within the well to initiate a reaction.

FIG. 5A is a diagram of an apparatus or system 150 including a dual-chamber tool 152. The tool 152 includes a first chamber 154 containing the first liquid composition A and a second chamber 156 containing the second liquid composition B. The tool 152 is lowered into the pipe 136 prior to mixing the compositions within the well to initiate a reaction. In FIG. 5A, the tool 152 is shown having been lowered on the end of a jointed pipe 157 but could also be lowered on coiled tubing, electric wireline or slickline as shown in system 170 of FIG. 5B. The tool 152 keeps the first and second liquid compositions separate in their respective chambers 154, 156 until the tool has been lowered into a position in or near a target region of the pipe 136 where the first and second liquid compositions will be dispensed into the wellbore.

Once the tool 152 is in a desired location within the well, the tool may be activated to force the two chemical components through a mixing chamber 159 that ensures proper mixing of the first and second liquid compositions. The compositions are mixed as they pass through the mixing chamber 159 and are then directly out of the mixing chamber and into the desired location of the well. Upon mixing, the reactive components of the first and second liquid compositions may begin to catalyze or otherwise harden or react.

Figure 5B:
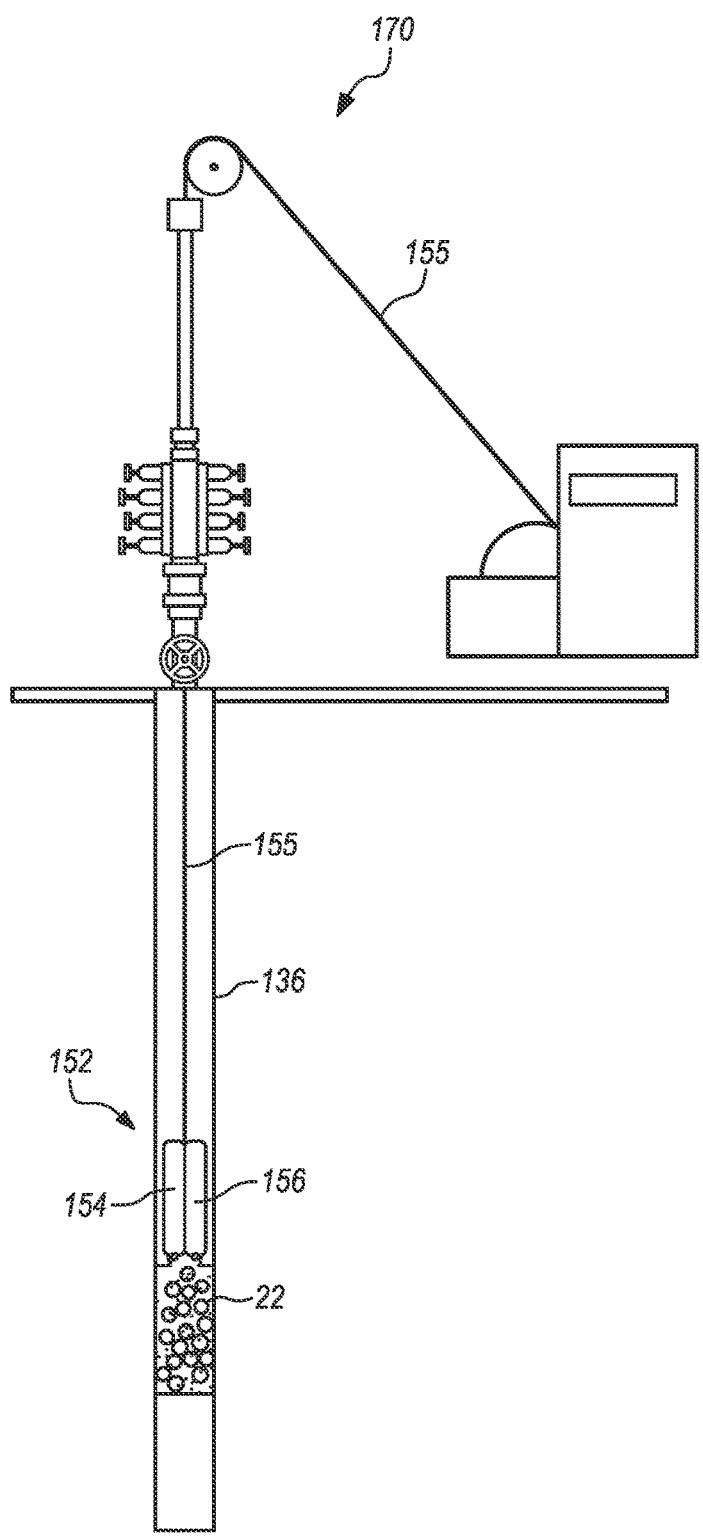

FIG. 5B is a diagram of an apparatus or system 170 similar to the system 150 in FIG. 5A, except that the tool 152 is lowered on an electric wireline or slickline 155. Otherwise, the tool 152 may be operated as described in reference to FIG. 5A to mix and dispense the first and second liquid compositions into the target region of the pipe 36 and subsequently flow over the solid epoxy material (illustrated as the solid epoxy particulates 22 of FIG. 2) and cure to form a plug.

Figure 6A:
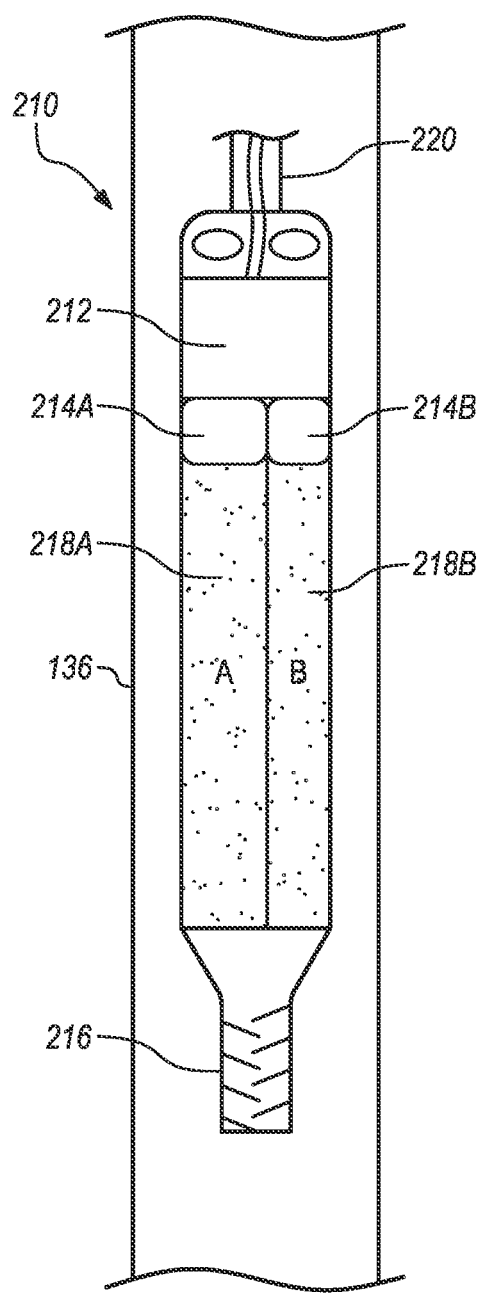
FIGS. 6A-B are diagrams of the dual-chamber tool including an electric pump and a pair of plungers for discharging the two separate liquid compositions through a static mixer and into the well.
Figure 6B:
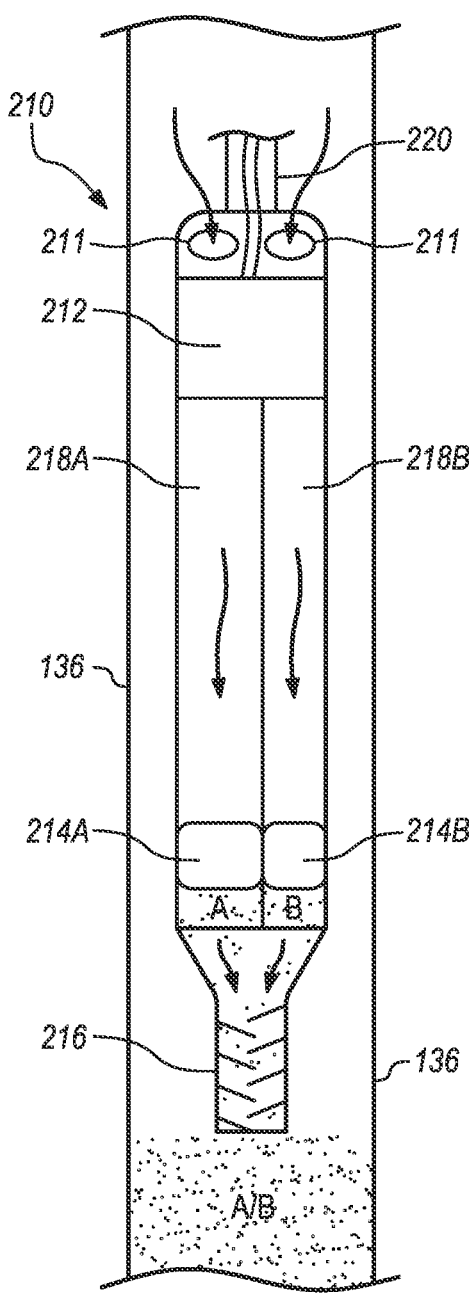

FIGS. 6A-B are diagrams of a dual-chamber tool 210 including an electric pump 212 and a pair of plungers 214 for discharging the two separate liquid compositions (A and B) through a static mixer 216 and into the pipe 136. The dual-chamber tool 210 may be used in the system 150 or system 170 of FIGS. 5A-B, such as in place of tool 152.

The first and second liquid compositions A and B are loaded into separate chambers 218A, 218B of the tool 210. Compositions A and B are prevented from reacting while in the tool 210 due to being kept in the separate chambers. The tool 210 is then lowered into the pipe 136 on electric wireline 220 that provides electrical power to the pump 212.

The tool 210 may be supported by the electric wireline 220 such that the electric pump 212 may be controllably activated from the surface. The pump 212 may draw in a surrounding fluid through a set of inlet ports 211 and directs the compressed fluid against a pair of plungers 214A, 214B. As fluid continues to be pumped into the tool, the plungers 214A, 214B compress the compositions A and B, respectively, forcing the composition through the static mixer 216. The compositions A and B are mixed as they pass through the static mixer at the same time, the reactive components begin reacting, and the mixed compositions are deposited in the target region of the pipe 136. The chambers 218A, 218B may have a cylindrical cross-sectional shape and may be sized to provide the desired volumetric ratio of the first and second compositions (A and B).

The foregoing methods may be controlled by a computer executing a computer program product that includes program instructions for implementing or initiating any one or more aspects of the methods described herein. Accordingly, some embodiments may include a computer program product comprising a non-volatile computer readable medium and non-transitory program instructions embodied therein, the program instructions being configured to be executable by a processor to cause the processor to perform various operations of the methods. Still further, some embodiments may include an apparatus as disclosed for performing the methods, such as the apparatus shown in the Figures. However, some embodiments of the apparatus may be directed to, or further include, a controller or apparatus comprising at least one non-volatile storage device storing program instructions and at least one processor configured to process the program instructions, wherein the program instructions are configured to, when processed by the at least one processor, cause the apparatus to perform various operations of the methods.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A method comprising:
deploying a solid epoxy material into a target region of a pipe positioned in a wellbore, wherein the pipe is selected from a pipe string, tubing string or wellbore casing; and
delivering a liquid epoxy formulation into the target region of the pipe so that the liquid epoxy formulation fills voids around the solid epoxy material and inside the pipe within the target region, wherein the liquid epoxy formulation cures within the voids to form a solid epoxy plug with the solid epoxy material within the target region of the pipe;
wherein the solid epoxy plug is a solid monolithic plug.

2. The method of claim 1, wherein the liquid epoxy formulation fills voids within the target region and around the solid epoxy material, and wherein the liquid epoxy formulation reacts with a surface of the solid epoxy material.

3. The method of claim 1, wherein the solid epoxy plug forms a gas tight seal within the pipe.

4. The method of claim 1, wherein the liquid epoxy formulation is delivered into the target region under a pressure that is greater than a pressure within the target region of the pipe.

5. The method of claim 1, further comprising:
forming the liquid epoxy formulation by combining an epoxy resin portion and a hardener portion within the pipe within the target region.

6. The method of claim 1, wherein the solid epoxy material forms between 50% and 90% of the solid epoxy plug.

7. The method of claim 1, wherein the solid epoxy material is formed from an epoxy formulation that is the same as the liquid epoxy formulation delivered into the target region of the pipe.

8. The method of claim 1, where the solid epoxy material and the liquid epoxy formulation have the same density.

9. The method of claim 1, where the density of the solid epoxy material is less than the density of a wellbore fluid present within the pipe, and wherein the density of the liquid epoxy formulation is less than the density of the wellbore fluid present within the pipe.

10. The method of claim 1, wherein the solid epoxy material includes particulates.

11. The method of claim 10, wherein the solid epoxy material is deployed into the target region of the pipe by discharging the solid epoxy material from a bailer or by dropping the solid epoxy material into an upper end of the pipe.

12. The method of claim 1, wherein the solid epoxy material includes a solid epoxy member having a length dimension that is greater than an internal diameter of the pipe.

13. The method of claim 12, wherein the solid epoxy member has an aspect ratio between about 3 and about 9.

14. The method of claim 12, wherein the solid epoxy member is a cylinder.

15. The method of claim 12, wherein the solid epoxy member has a central axis and a uniform cross-sectional profile along the central axis.

16. The method of claim 15, wherein the solid epoxy member is coupled to a centralizer for centering the solid epoxy member within the pipe and providing an annular region around the solid epoxy member where the liquid epoxy formulation is delivered.

17. The method of claim 15, wherein the solid epoxy member is deployed into the target region of the pipe by dropping the solid epoxy member into an upper end of the pipe or by lowering the solid epoxy member on a pipe, slickline or wireline.

18. The method of claim 1, wherein the solid epoxy plug is formed as part of a plugback operation, a plug and abandon operation, or a water shut off operation.

\* \* \* \* \*